(12) United States Patent
Perley et al.

(10) Patent No.: US 8,704,393 B2
(45) Date of Patent: Apr. 22, 2014

(54) SYSTEM AND METHOD FOR CONTROLLING SPEED AND TORQUE OF A WIND TURBINE DURING POST-RATED WIND SPEED CONDITIONS

(75) Inventors: Thomas Franklin Perley, Simpsonville, SC (US); Brandon Shane Gerber, Charleston, SC (US); Aaron Yarbrough, Clemson, SC (US)

(73) Assignee: General Electric Company, Schenectady, NY (US)

(*) Notice: Subject to any disclaimer, the term of this patent is extended or adjusted under 35 U.S.C. 154(b) by 57 days.

(21) Appl. No.: 13/570,651

(22) Filed: Aug. 9, 2012

(65) Prior Publication Data

US 2014/0042745 A1 Feb. 13, 2014

(51) Int. Cl.
*F03D 9/00* (2006.01)
*H02P 9/04* (2006.01)

(52) U.S. Cl.
USPC .............................. 290/44; 290/55

(58) Field of Classification Search
USPC ........................................ 290/44, 55
See application file for complete search history.

(56) References Cited

U.S. PATENT DOCUMENTS

| | | | |
|---|---|---|---|
| 5,155,375 A * | 10/1992 | Holley | 290/44 |
| 6,600,240 B2 | 7/2003 | Mikhail et al. | |
| 7,180,202 B2 * | 2/2007 | Wobben | 290/44 |
| 7,203,078 B2 * | 4/2007 | Datta et al. | 363/37 |
| 7,352,075 B2 * | 4/2008 | Willey et al. | 290/44 |
| 7,352,076 B1 * | 4/2008 | Gabrys | 290/44 |
| 7,420,289 B2 * | 9/2008 | Wang et al. | 290/44 |
| 7,476,985 B2 | 1/2009 | Llorente Gonzalez | |
| 7,504,738 B2 * | 3/2009 | Barton et al. | 290/44 |
| 7,525,209 B2 * | 4/2009 | Kabatzke et al. | 290/44 |
| 7,528,496 B2 * | 5/2009 | Fortmann | 290/44 |
| 7,586,206 B2 * | 9/2009 | Barton et al. | 290/44 |
| 7,602,075 B2 * | 10/2009 | Erdman et al. | 290/44 |
| 7,714,458 B2 * | 5/2010 | Harms et al. | 290/44 |
| 7,948,104 B2 * | 5/2011 | Andersen | 290/44 |
| 8,128,362 B2 * | 3/2012 | Andersen et al. | 416/1 |
| 8,242,620 B2 * | 8/2012 | Kikuchi et al. | 290/44 |
| 8,393,864 B2 * | 3/2013 | Wobben | 416/1 |
| 8,450,868 B2 * | 5/2013 | Tsutsumi et al. | 290/44 |
| 8,466,573 B2 * | 6/2013 | Kikuchi et al. | 290/44 |
| 8,546,968 B2 * | 10/2013 | Wakasa et al. | 290/44 |
| 2005/0012339 A1 * | 1/2005 | Mikhail et al. | 290/44 |
| 2005/0286279 A1 * | 12/2005 | Datta et al. | 363/89 |
| 2007/0069522 A1 * | 3/2007 | Barton et al. | 290/44 |
| 2007/0216166 A1 * | 9/2007 | Schubert | 290/55 |
| 2008/0150282 A1 * | 6/2008 | Rebsdorf et al. | 290/44 |
| 2009/0108583 A1 * | 4/2009 | Barton et al. | 290/44 |
| 2009/0174186 A1 * | 7/2009 | Nyborg | 290/44 |
| 2009/0212566 A1 * | 8/2009 | Harms et al. | 290/44 |

(Continued)

FOREIGN PATENT DOCUMENTS

WO   WO 97/09531   3/1997

*Primary Examiner* — Pedro J Cuevas
(74) *Attorney, Agent, or Firm* — Dority & Manning, P.A.

(57) ABSTRACT

A method and system for controlling a wind turbine generator at wind speeds in excess of rated wind speed to detect wind speeds and, at rated wind speed, control generator torque and generator rotational speed to achieve a rated power for the wind turbine generator. As wind speed increases beyond the rated wind speed, one of generator torque or generator rotational speed is increased and the other of generator rotational speed or generator torque is proportionally decreased to maintain the generator power substantially constant at rated power.

15 Claims, 5 Drawing Sheets

(56) References Cited

U.S. PATENT DOCUMENTS

| | | |
|---|---|---|
| 2009/0218818 A1 | 9/2009 | Cardinal et al. |
| 2012/0056602 A1* | 3/2012 | Li et al. ............ 322/89 |
| 2012/0104752 A1* | 5/2012 | Tsutsumi et al. ............ 290/44 |
| 2012/0104754 A1* | 5/2012 | Rudolf et al. ............ 290/44 |
| 2012/0256422 A1* | 10/2012 | Fradella ............ 290/55 |
| 2013/0025352 A1* | 1/2013 | Teres Teres et al. ............ 73/112.01 |
| 2013/0259686 A1* | 10/2013 | Blom et al. ............ 416/1 |

* cited by examiner

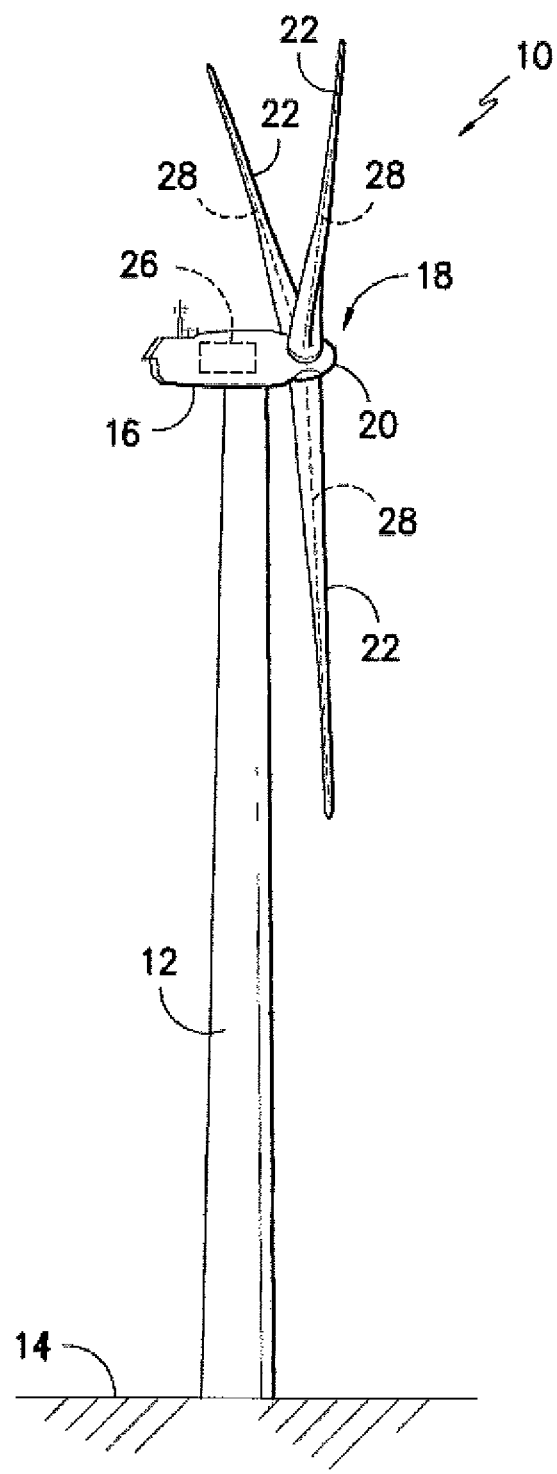
FIG. -1-

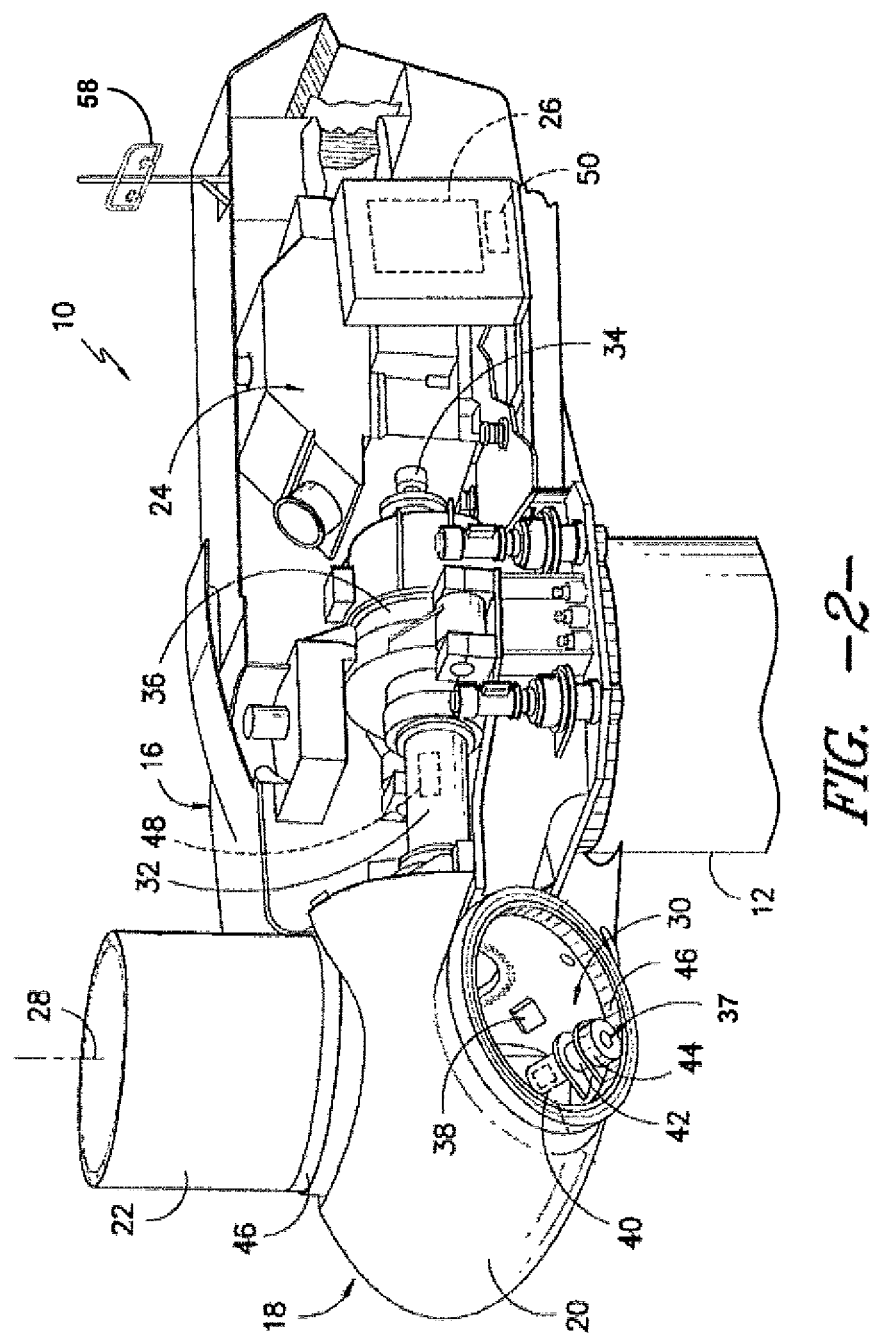
FIG. -2-

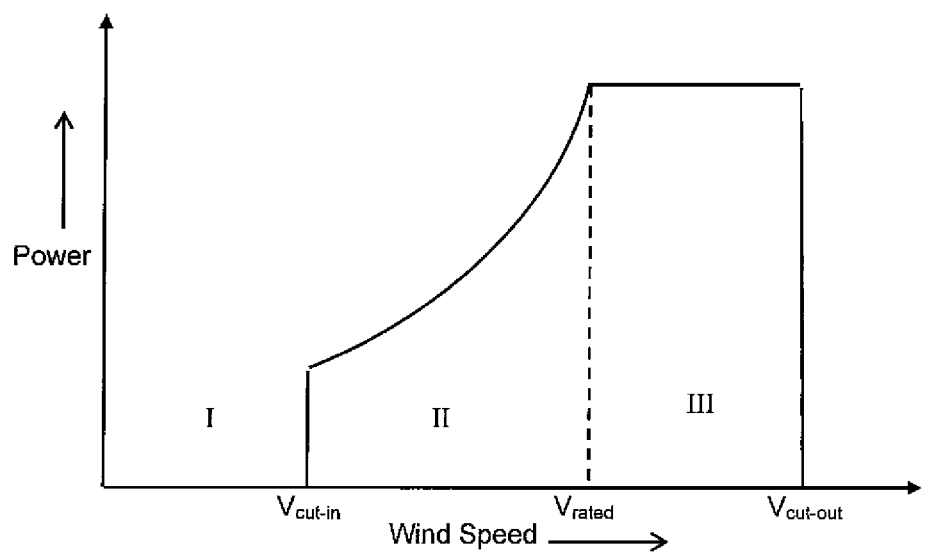
*FIG. -3-*
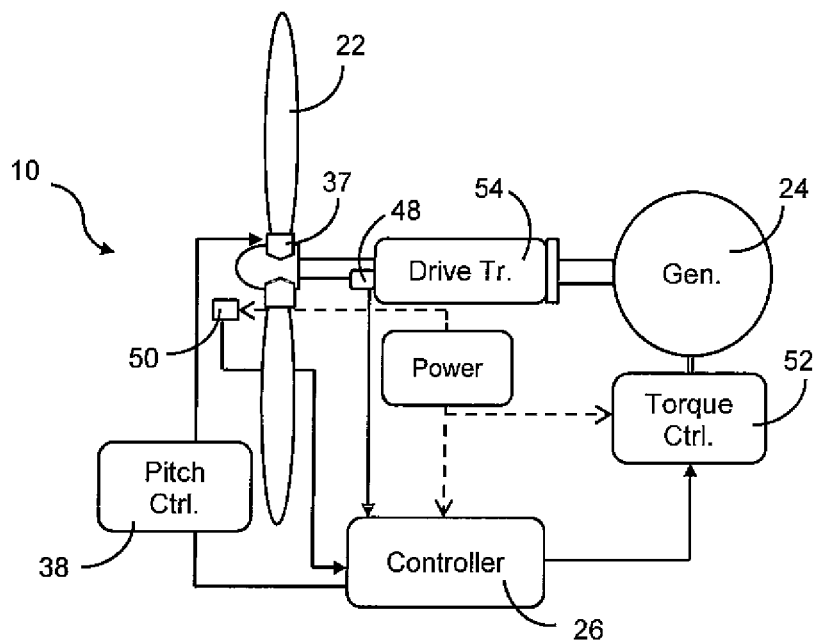
*FIG. -4-*

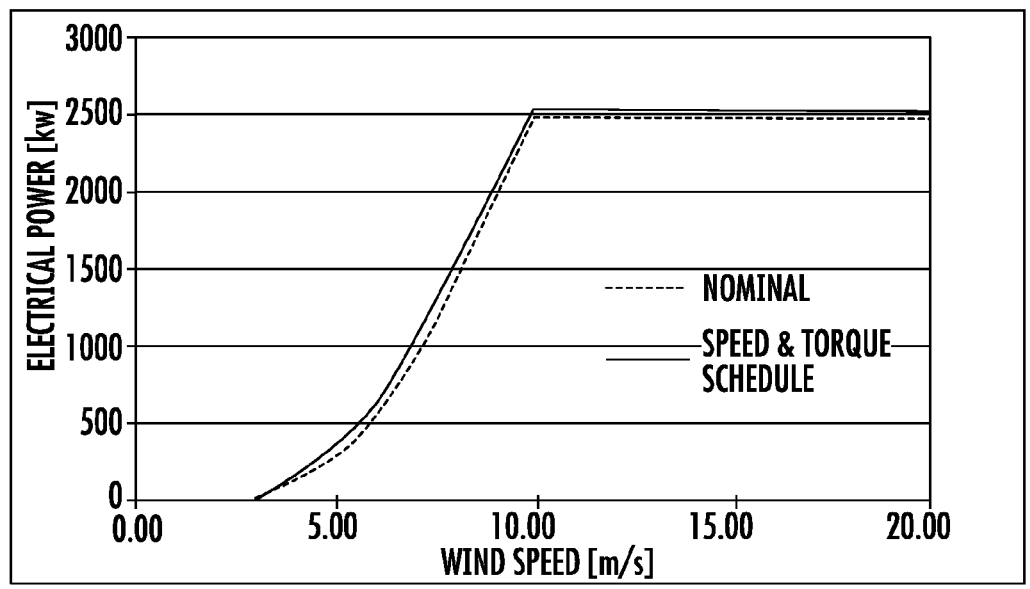
FIG. -5-
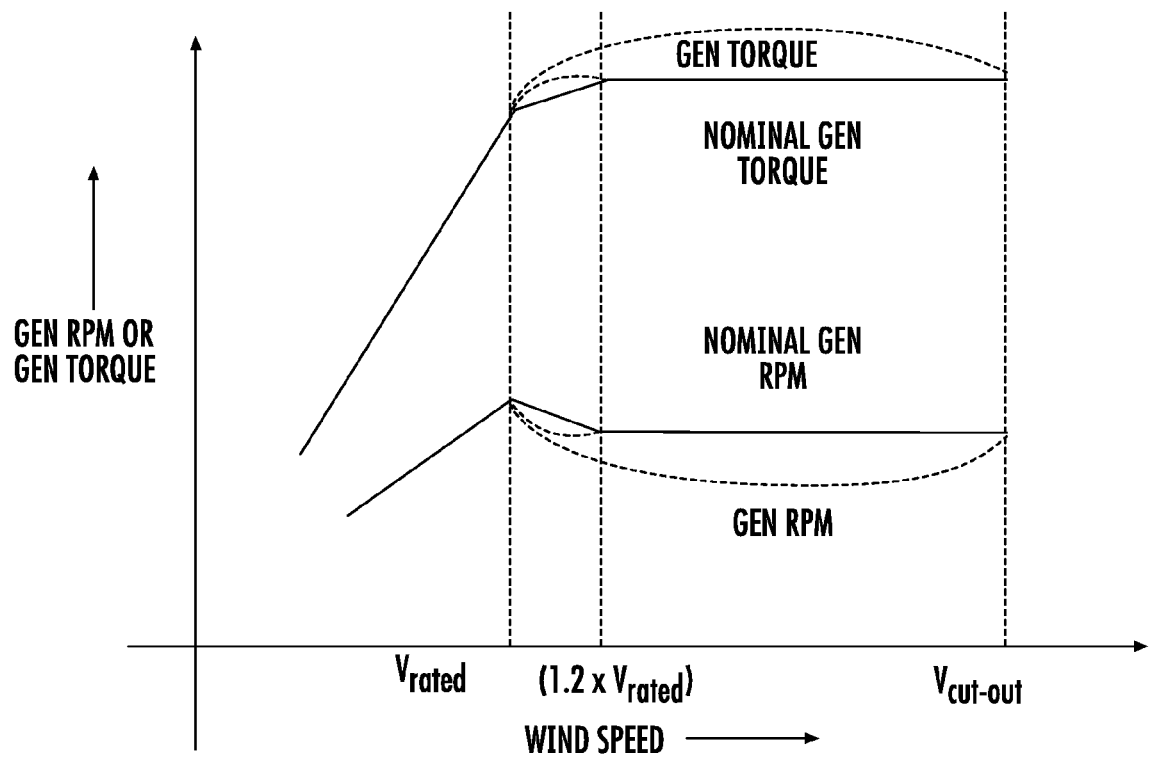
FIG. -6-

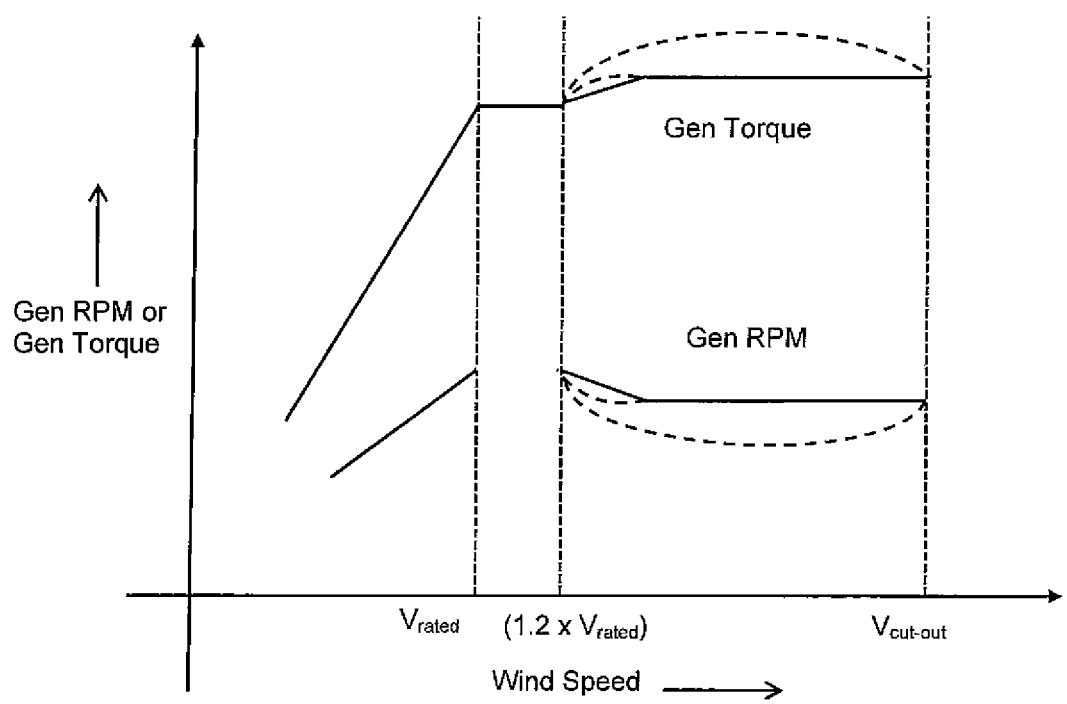
FIG. -7-

SYSTEM AND METHOD FOR CONTROLLING SPEED AND TORQUE OF A WIND TURBINE DURING POST-RATED WIND SPEED CONDITIONS

FIELD OF THE INVENTION

The present subject matter relates generally to wind turbines, and more particularly to a system and method for varying the speed and torque of a wind turbine during post-rated wind speed conditions for reducing extreme and fatigue loads on various wind turbine components.

BACKGROUND OF THE INVENTION

A wind turbine includes a rotor having multiple blades to transform wind energy into rotational torque that drives a generator, which is coupled to the rotor through a drive train and gearbox. The gearbox steps up the inherently low rotational speed of the rotor for the generator to efficiently convert the mechanical energy to electrical energy, which is fed to a utility grid.

Referring to FIG. 3, modern utility-grade wind turbines are generally operated in accordance with a design power curve wherein in a first region (Region I), the wind speed is too low to warrant turbine operation and the turbine blades are pitched to a full feather position corresponding to the pitch angle that produces minimum aerodynamic torque. At a wind speed sufficient for start-up ($V_{cut-in}$), the blades are pitched to a Region II nominal pitch angle wherein a maximum aerodynamic lift is generated to produce torque and turn the rotor. In Region II, the wind speed and generator torque are below "rated", and blade pitch is generally held constant at an optimal angle to produce maximum aerodynamic torque. With an increase in wind speed in Region II, power captured by the wind turbine increases along with mechanical loads on the turbine structure and components.

At "rated" wind speed ($V_{rated}$), the wind turbine reaches its rated power in Region III of the design power curve. In this region, the wind turbine power is limited to rated power to maintain the machine loads within design limits. Generator torque is held constant and blade pitch is controlled to regulate turbine speed at rated speed. For safety and machine load considerations, the wind turbine is shut down for wind speeds in excess of a defined cut-out wind speed ($V_{cut-out}$).

The fatigue and extreme load limits over the design life of the wind turbine are, as expected, generated primarily at wind speeds in excess of $V_{rated}$, particularly at wind speed approaching $V_{cut-out}$. This wind speed is generally known for various wind turbine designs.

Prior attempts to reduce extreme and fatigue loads in Region III of the power curve included control profiles that reduced the turbine rated speed and generator torque. However, this resulted in a corresponding decrease in power, thereby adversely affecting the wind turbine's annual energy production (AEP). For example, the PCT publication WO 97/09531 describes a control methodology for reducing loads on a wind turbine wherein, at a defined wind speed, power is reduced as a function of wind speed by reducing the rotational speed of the turbine rotor.

Accordingly, an improved system and method are desired for reducing loads on a wind turbine at high wind speeds without sacrificing power and turbine AEP.

BRIEF DESCRIPTION OF THE INVENTION

Aspects and advantages of the invention will be set forth in part in the following description, or may be obvious from the description, or may be learned through practice of the invention.

In one aspect of the invention, a method for controlling a wind turbine generator at wind speeds in excess of rated wind speed includes detecting wind speeds and, at rated wind speed for the wind turbine, controlling generator torque and generator rotational speed to achieve rated power for the wind turbine generator. As wind speed increases beyond the rated wind speed, the method includes proportionally increasing one of generator torque or generator rotational speed and decreasing the other of generator rotational speed or generator torque to maintain generator power substantially constant at rated power.

In a particular embodiment, the method may include controlling blade pitch to reduce or increase generator rotational speed at the wind speeds in excess of rated wind speed.

In certain embodiments, the generator torque and rotational speed are controlled in accordance with a defined wind speed profile starting at a defined wind speed at or above rated wind speed ($V_{rated}$) that is generally known or predetermined for the particular wind turbine design.

In an embodiment wherein generator torque is increased and generator rotational speed is decreased proportionally, the defined wind speed profile for generator torque may, in certain embodiments, include an initial ramp up stage followed by a steady state torque value. The defined wind speed profile for generator rotational speed may include an initial ramp down stage followed by a steady state rotational speed.

In a further embodiment, the defined wind speed profiles for generator torque and rotational speed may vary from $V_{rated}$ to a cut-out wind speed ($V_{cut-out}$). For example, the defined wind speed profiles for generator torque and rotational speed may vary substantially continuously from $V_{rated}$ to $V_{cut-out}$. In a particular embodiment, the defined wind speed profile for generator torque has an initial increasing stage followed by a decreasing stage, and the defined wind speed profile for generator rotational speed includes an initial decreasing stage followed by an increasing stage from $V_{rated}$ to a cut-out wind speed ($V_{cut-out}$).

In certain embodiments, at $V_{rated}$, a nominal generator torque and nominal generator rotational speed are defined for the rated power of the wind turbine generator, wherein the generator torque or generator rotational speed is increased and the other of generator rotational speed or generator torque is decreased proportionally at wind speeds in excess of $V_{rated}$ relative to the respective nominal values. This embodiment may include periodically controlling the wind turbine at the nominal generator torque and nominal generator rotational speed for the rated power substantially continuously between $V_{rated}$ and a cut-out wind speed ($V_{cut-out}$).

It should be appreciated that the present invention also encompasses any configuration of a wind turbine operated in accordance with any of the method embodiments described herein. For example, a wind turbine may include a torque controller coupled to the generator to control generator torque, and a pitch controller coupled to the turbine blades to perform pitch regulation of generator rotational speed. The torque controller and pitch controller are operated to control generator torque and generator rotational speed to achieve a rated power for the wind turbine generator and, as wind speed increases beyond rated wind speed, to proportionally increase one of generator torque or generator rotational speed and decrease the other of generator rotational speed to maintain generator power substantially constant at rated power.

In certain embodiments, the torque controller controls generator torque and the pitch controller controls generator rotational speed in accordance with respective defined wind speed profiles starting at a wind speed at or above rated wind speed ($V_{rated}$). In an embodiment wherein generator torque is proportionally increased and generator rotational speed is proportionally decreased, the defined wind speed profile for generator torque may include an initial ramp up stage followed by a steady state torque value, and the defined wind speed profile for generator rotational speed may include an initial ramp down stage followed by a steady state rotational speed. In an alternate embodiment, the defined wind speed profiles for generator torque and rotational speed vary from $V_{rated}$ to a cut-out wind speed ($V_{cut-out}$). For example, the defined wind speed profiles for generator torque and rotational speed may vary substantially continuously from $V_{rated}$ to $V_{cut-out}$.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a conventional wind turbine;

FIG. 2 illustrates a simplified, internal view of one embodiment of a nacelle of a wind turbine;

FIG. 3 is a diagram of a conventional power curve for a wind turbine generator;

FIG. 4 is a block diagram of a wind turbine control components in accordance with an embodiment of the invention;

FIG. 5 is a diagram of generator power relative to wind speed in accordance with embodiments of the invention;

FIG. 6 is a diagram of generator speed and generator torque relative to wind speed in accordance with embodiments of the invention; and FIG. 7 is a diagram of generator speed and generator torque relative to wind speed in accordance with other embodiments of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling a wind turbine generator at wind speeds in excess of rated wind speed wherein wind speed is detected and, at rated wind speed, controlling generator torque and generator rotational speed in accordance with a pre-defined profile to achieve a rated power for the wind turbine generator. According to the profile, as wind speed increases beyond the rated wind speed ($V_{rated}$), one of generator torque or generator rotational speed is increased and the other of generator rotational speed or generator torque is proportionally decreased to maintain the generator power substantially constant at rated power. In a particular embodiment, blade pitch is controlled to increase or decrease generator rotational speed at the wind speeds in excess of rated wind speed. The generator torque and rotational speed may be controlled in accordance with a defined wind speed profile starting at a defined wind speed at or above rated wind speed ($V_{rated}$).

Various aspects of the invention will be explained herein by reference to embodiments wherein generator torque is increased and generator speed in decreased proportionally. This is for illustrative purposes. It should be appreciated that the inverse relationship is applicable as well for each of these embodiments wherein generator torque is decreased and generational rotational speed is increased proportionally.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or main controller 26 centralized within the nacelle 16. In general, the main controller 26 may comprise a computer or other suitable processing unit. Thus, in several embodiments, the main controller 26 may include suitable computer-readable instructions that, when implemented, configure the controller 26 to perform various different functions, such as receiving, transmitting and/or executing wind turbine control signals (e.g., pitch commands). As such, the main controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 as well as the loads acting on the rotor blade 22. For example, the main controller 26 may individually control the pitch angle of each rotor blade 22 by transmitting suitable pitch commands to a pitch system 30 (FIG. 2) of the rotor blade 22. During operation of the wind turbine 10, the controller 26 may generally transmit pitch commands to each pitch system 30 in order to alter the pitch angle of each rotor blade 22 between 0 degrees (i.e., a power position of the rotor blade 22) and 90 degrees (i.e., a feathered position of the rotor blade 22).

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the main controller 26 may also be located within the nacelle 16. As is generally understood, the main controller 26 may be communicatively coupled to any number of the components of the wind turbine 10 in order to control the operation of such components. For example, as indicated above, the main controller 26 may be communicatively coupled to each pitch system 30 of the wind turbine 10 (one of which is shown) to facilitate rotation of each rotor blade 22 about its pitch axis 28.

As shown in FIG. 2, each pitch system 30 may include a pitch adjustment mechanism 36 and a pitch controller 38 communicably coupled to the pitch adjustment mechanism 36. In general, each pitch adjustment mechanism 36 may include any suitable components and may have any suitable configuration that allows the pitch adjustment mechanism 36 to function as described herein. For example, in several embodiments, each pitch adjustment mechanism 36 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28.

In alternative embodiments, it should be appreciated that each pitch adjustment mechanism 36 may have any other suitable configuration that facilitates rotation of a rotor blade 22 about its pitch axis 28. For instance, pitch adjustment mechanisms 36 are known that include a hydraulic or pneumatic driven device (e.g., a hydraulic or pneumatic cylinder) configured to transmit rotational energy to the pitch bearing 46, thereby causing the rotor blade 22 to rotate about its pitch axis 28. Thus, in several embodiments, instead of the electric pitch drive motor 40 described above, each pitch adjustment mechanism 36 may include a hydraulic or pneumatic driven device that utilizes fluid pressure to apply torque to the pitch bearing 46.

The operation of the pitch adjustment mechanism 36 for each rotor blade 22 may generally be controlled by the main controller 26 via the individual pitch controller 38 for that rotor blade 22. Thus, in several embodiments, the main controller 26 and each pitch controller 38 may be in communication with one another and/or the pitch adjustment mechanism 36 via a wired connection, such as by using a suitable communicative cable. In other embodiments, the main controller 26 and each pitch controller 38 may be in communication with one another and/or the pitch adjustment mechanism 36 via a wireless connection, such as by using any suitable wireless communications protocol known in the art.

It should be appreciated that, although the main controller 26 may generally be utilized to control the pitch adjustment mechanisms 36 via the pitch controllers 38, each pitch controller 38 may also be configured to independently control the operation of its respective pitch adjustment mechanism 36. For example, when a communication failure occurs between the main controller 26 and one or more of the pitch controllers 38 (e.g., due to power loss, controller failure, communication breakdown and/or the like), the pitch controllers 38 may be configured to implement the stopping procedures described herein in order to stop the operation of the wind turbine 10.

Referring still to FIG. 2, the wind turbine 10 may also include a plurality of sensors 48, 50 for monitoring one or more operating conditions of the wind turbine 10 for purposes of the present method and system. As used herein, an operating condition of the wind turbine 10 is "monitored" when a sensor 48, 50 is used to determine its present value. Thus, the term "monitor" and variations thereof are used to indicate that the sensors 48, 50 need not provide a direct measurement of the operating condition being monitored. For example, one or more sensors 48 (such as an optical encoder) may be operatively configured at a suitable location along the drive train 54 (FIG. 4) to directly or indirectly measure the rotational speed of the generator rotor. For example, the rotor speed may be derived from a sensor 48 that measures the speed of the rotor hub 20, low speed shaft 32, generator shaft 34, and so forth. A wind speed sensor 50 may receive a signal from an anemometer 58 suitably located to measure incident wind speed on the blades 22.

In addition, the wind turbine 10 may also include additional sensors for monitoring various other operating conditions of the wind turbine 10. For instance, the wind turbine 10 may include one or more sensors configured to monitor the operation of the pitch adjustment mechanisms 36 (e.g., by monitoring the current input to and/or the torque output of each pitch adjustment mechanism 36). In addition, the wind turbine 10 may include one or more sensors configured to monitor the operation of the main controller 26 and/or the pitch controllers 38, such as by monitoring the power to and commands transmitted from such controller(s) 26, 38. Further, the wind turbine 10 may also include various other sensors for monitoring any other suitable operating conditions of the wind turbine 10, such as the pitch angle of each rotor blade 22, the speed of the rotor 18 and/or the rotor shaft 32, the speed of the generator 24 and/or the generator shaft 34, the torque on the rotor shaft 32 and/or the generator shaft 34, the wind speed and/or wind direction, grid conditions, power input to the components of the wind turbine 10 and/or any other suitable operating conditions.

Referring now to FIG. 4, there is illustrated a block diagram of one embodiment of a suitable system configuration for accomplishing the desired control functions in accordance with aspects of the invention wherein the main controller 26 is interfaced with the pitch controllers 38 and a torque control system 52, as well as the rotor speed sensor 48 and wind speed sensor 50. The controller 26 may include one or more processors and associated memory devices configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory devices may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory devices may generally be configured to store suitable computer-readable instructions that, when implemented by the processor(s), configure the controller 26 to perform various functions including, but not limited to, transmitting suitable control signals to one or more of the pitch adjustment mechanisms 36, control generator torque, monitor various operating conditions of the wind turbine 10, and implement the disclosed generator torque and speed profiles in accordance with aspects of the present methodology.

Referring again to FIG. 4, the wind turbine 10 provides a variable speed system having a wound rotor induction generator 24, torque controller 52, and a proportional, integral derivative (PID) pitch (or speed) controller 38 in communication with the individual pitch drives 37. The induction generator may be a slip ring or non-slip ring induction generator. The system uses the wound rotor induction generator with a power converter system to ensure the delivery of constant frequency power to the grid. Note that although grid applications are described, it would be apparent to one skilled in the art that the present invention may also be applied to other applications such as stand-alone power systems.

The power converter controls the wound rotor induction generator 24 according to a predetermined power-speed curve (FIG. 3). By following the predetermined power-speed curve, the variable speed system is able to operate the turbine at the maximum power coefficient (Cp) from cut-in to rated wind speeds (Region II in FIG. 3), thereby ensuring that maximum aerodynamic energy capture is achieved. It should be noted that the power-speed curve is related to a torque-speed curve by the equation (torque=power/angular velocity). The power-speed curve is encoded in the power converter in the form of a look-up table (LUT) of power and corresponding generator speeds. The LUT may reside in hardware or software. To control torque, the power converter measures generator rotor speed, interpolates the LUT to determine the target turbine output power, and calculates the desired generator torque from the relation (torque=power/angular velocity) using the generator rotor speed. In one embodiment, this torque is produced by determining the required current vector and, using well-known pulse width modulation techniques, produces this vector. In one embodiment, due to slight differences between theoretical and actuality, the power converter of the present invention employs a closed loop PI controller which compares actual turbine power output to a target, or desired, output and makes small adjustments to the torque calculation to achieve and maintain a desired turbine output.

The torque controller 52 uses field oriented control (FOC) to produce generator torque as a function of generator rotor speed. Using the stator current, the rotor current and the rotor angle as inputs, the torque controller of the power converter identifies the flux vector and commands the required rotor current vector which, upon interaction with the stator flux vector, produces the desired generator torque. The rotor current is created by the appropriate switching of the converter insulated gate bipolar transistors (IGBTs) using well-known pulse width modulation (PWM) current regulation techniques, such as described in U.S. Pat. No. 5,083,039, entitled "Variable Speed Wind Turbine", issued in Jan. 21, 1992. In this manner, the power control system follows an aerodynamically optimized power/torque speed profile. Note that the look up table values containing the power/torque-speed profile are based on the aerodynamics of the particular wind turbine rotor and wind turbine rotor geometry. Therefore, the table values set may vary for different turbine rotors.

Torque control in a wind turbine generator is well-known to those skilled in the art and need not be described in greater detail herein. A more detailed discussion of torque control concepts and systems is set forth in U.S. Pat. No. 6,600,240.

The pitch controller 38 controls generator rotor speed by pitching the blades of a wind turbine. The pitch controller 38 provides real-time proportional pitch position of the blades 22, as well as turbine speed regulation, by using a proportional, integral, derivative (PID) controller. The PID controller performs pitch regulation based on generator rotor speed and typically operates independently of the torque controller in the power converter. In conventional systems, the PID controller is a closed loop PID controller that generates a pitch velocity to perform pitch regulation while at or above rated wind speeds. The PID controller may begin to perform pitch regulation at wind speeds less than rated wind speeds. Typically, however, below rated speed, the pitch angle is fixed at full power-on position. In one embodiment, the PID controller generates an output voltage in response to a difference between the target rotor speed and the measured (or actual) rotor speed, which a non-linear LUT uses to output a pitch velocity in response thereto.

Although the pitch controller 38 is described in conjunction with a PID controller, a proportional, integral (PI) controller, a proportional, derivative (PD) controller, or a proportional controller may be used in other embodiments. Other lead-lag or lag-lead controllers can also be used. Also, although the present invention is described in conjunction with a closed loop controller, an open loop controller may be used, such as an open loop controller with a derivative term or a Model Based Controller. These types of controllers are well-known in the art.

Various aspects of exemplary method embodiments are explained by reference to FIGS. 5 through 7. The methods entail controlling the wind turbine generator at wind speeds in excess of rated wind speed ($V_{rated}$). The wind speed incident on the rotor blades 22 is detected. For example, actual wind speed may be detected via anemometer 58 and associated sensor circuitry 50. In an alternate embodiment, wind speed may be derived from another parameter, such as hub rotational speed, gear train shaft speeds, and so forth. As with conventional control schemes, at rated wind speed for the wind turbine, generator torque and generator rotational speed are controlled and nominal values to achieve rated power for the wind turbine generator, as particularly illustrated in FIG. 6. As wind speed increases beyond rated wind speed, the method includes proportionally varying ("scheduling") generator torque and decreasing generator rotational speed. For example, generator rotor speed may be reduced by 2% and generator torque may be increased by 2%, or vice-versa. This proportional increase/decrease of generator speed and generator torque, respectively, maintains generator power substantially constant at rated power between $V_{rated}$ to cut-out wind speed ($V_{cut-out}$).

In a particular embodiment, the method may include controlling blade pitch via the pitch controller 38 to reduce generator rotational speed at the wind speeds in excess of rated wind speed, while generator torque is controlled via the torque controller 52, as described above.

Still referring to FIGS. 6 and 7, in certain embodiments, the generator torque and rotational speed are controlled in accordance with a defined wind speed profile starting at a defined wind speed at or above rated wind speed ($V_{rated}$). For example, in the embodiment of FIG. 7, the proportional increase and decrease of speed and torque are commenced essentially at rated wind speed. In the embodiment of FIG. 8, the proportional increase and decrease of speed and torque are commenced at a defined wind speed above rated wind speed.

As depicted in FIGS. 6 and 7, the defined wind speed profile for generator torque and generator speeds above $V_{rated}$ may vary. In certain embodiments, the generator torque profile may include an initial ramp up stage followed by a steady state torque value. Likewise, the wind speed profile for generator rotational speed may include a proportional initial ramp down stage followed by a steady state rotational speed. These ramp stages may be linear or non-linear, followed by the steady state proportional torque and speed values.

In a further embodiment depicted in FIGS. 6 and 7, the defined wind speed profiles for generator torque and rotational speed may vary substantially continuously from the defined speed at $V_{rated}$ or higher to $V_{cut-out}$. For example, the defined wind speed profiles for generator torque and rotational speed may have a curved profile wherein the defined wind speed profile for generator torque has an initial increasing stage followed by a decreasing stage to $V_{cut-out}$, and the defined wind speed profile for generator rotational speed includes an initial decreasing stage followed by an increasing stage from $V_{rated}$ to $V_{cut-out}$.

Referring to FIG. 6, at $V_{rated}$, in one control scheme, a nominal generator torque and nominal generator rotational speed may be defined for the rated power of the wind turbine generator, wherein the generator torque is increased and generator rotational speed decreased proportionally at wind speeds in excess of $V_{rated}$ relative to the respective nominal values. This embodiment may include periodically controlling the wind turbine at the nominal generator torque and nominal generator rotational speed for the rated power substantially continuously between $V_{rated}$ and $V_{cut-out}$.

FIG. 5 depicts that, because of the proportional increase and decrease in generator torque and generator speed, the power output of the generator is maintained relatively constant at rated (nominal) power between $V_{rated}$ and $V_{cut-out}$, as indicated by the superimposed profiles in FIG. 5.

It should be appreciated that the present invention also encompasses any configuration of a wind turbine 10 operated in accordance with any of the method embodiments described herein. For example, a wind turbine 10 may include a torque controller 52 coupled to the generator 24 to control generator torque, and a pitch controller 38 coupled to the turbine blade pitch drive mechanism to perform pitch regulation of generator rotational speed, as described above, in accordance with the present control methods. The torque controller 52 and pitch controller 38 are operated to control generator torque and generator rotational speed to achieve a rated power for the wind turbine generator 24 and, as wind speed increases beyond rated wind speed, to proportionally increase one of generator torque or generator rotational speed and decrease the other of generator rotational speed or generator torque to maintain generator power substantially constant at rated power.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine generator at wind speeds in excess of rated wind speed, comprising:
   detecting wind speeds and, at rated wind speed, controlling generator torque and generator rotational speed to achieve a rated power for the wind turbine generator; and
   as wind speed increases beyond the rated wind speed, proportionally increasing one of generator torque or generator rotational speed and decreasing the other of generator rotational speed or generator torque to maintain the generator power substantially constant at rated power.

2. The method as in claim 1, wherein blade pitch is controlled to reduce generator rotational speed at the wind speeds in excess of rated wind speed.

3. The method as in claim 1, wherein the generator torque and rotational speed are controlled in accordance with a defined wind speed profile starting at a defined wind speed at or above rated wind speed ($V_{rated}$).

4. The method as in claim 3, wherein generator torque is proportionally increased and generator rotational speed is proportionally decreased, the defined wind speed profile for generator torque includes an initial ramp up stage followed by a steady state torque value, and the defined wind speed profile for generator rotational speed includes an initial ramp down stage followed by a steady state rotational speed.

5. The method as in claim 3, wherein the defined wind speed profiles for generator torque and rotational speed vary from $V_{rated}$ to a cut-out wind speed ($V_{cut-out}$).

6. The method as in claim 5, wherein the defined wind speed profiles for generator torque and rotational speed vary substantially continuously from $V_{rated}$ to $V_{cut-out}$.

7. The method as in claim 6, wherein generator torque is proportionally increased and generator rotational speed is proportionally decreased, the defined wind speed profile for generator torque has an initial increasing stage followed by a decreasing stage, and the defined wind speed profile for generator rotational speed includes an initial decreasing stage followed by an increasing stage from $V_{rated}$ to a cut-out wind speed ($V_{cut-out}$).

8. The method as in claim 3, wherein at $V_{rated}$, a nominal generator torque and nominal generator rotational speed are defined for the rated power of the wind turbine generator, the generator torque increased and rotational speed decreased proportionally at wind speeds in excess of $V_{rated}$ relative to the respective nominal values.

9. The method as in claim 8, wherein the wind turbine is periodically controlled at the nominal generator torque and nominal generator rotational speed for the rated power substantially continuously between Vrated and a cut-out wind speed ($V_{cut-out}$).

10. A wind turbine, comprising:
   a generator rotationally driven by a plurality turbine blades configured on a rotor hub, said rotor hub coupled to said generator;
   a torque controller coupled to said generator to control generator torque;
   a pitch controller coupled to said turbine blades to perform pitch regulation of generator rotational speed; and
   wherein said torque controller and said pitch controller operate to control generator torque and generator rotational speed to achieve a rated power for the wind turbine generator, and as wind speed increases beyond rated wind speed, to proportionally increase one of generator torque or generator rotational speed and decrease the other of generator rotational speed or rotational torque to maintain generator power substantially constant at rated power.

11. The wind turbine as in claim 10, wherein said torque controller controls generator torque and said pitch controller controls generator rotational speed in accordance with respective defined wind speed profiles starting at a wind speed at or above rated wind speed ($V_{rated}$).

12. The wind turbine as in claim 11, wherein generator torque is proportionally increased and generator rotational speed is proportionally decreased, said defined wind speed profile for generator torque includes an initial ramp up stage followed by a steady state torque value, and said defined wind speed profile for generator rotational speed includes an initial ramp down stage followed by a steady state rotational speed.

13. The wind turbine as in claim 11, wherein said defined wind speed profiles for generator torque and rotational speed vary from $V_{rated}$ to a cut-out wind speed ($V_{cut-out}$).

14. The wind turbine as in claim 13, wherein said defined wind speed profiles for generator torque and rotational speed vary substantially continuously from $V_{rated}$ to $V_{cut-out}$.

15. The wind turbine as in claim 14, wherein generator torque is proportionally increased and generator rotational speed is proportionally decreased, said defined wind speed profile for generator torque has an initial increasing stage followed by a decreasing stage, and said defined wind speed profile for generator rotational speed includes an initial decreasing stage followed by an increasing stage from $V_{rated}$ to a cut-out wind speed ($V_{cut-out}$).

* * * * *